United States Patent [19]

Cain

[11] Patent Number: 5,778,174

[45] Date of Patent: Jul. 7, 1998

[54] METHOD AND SYSTEM FOR PROVIDING SECURED ACCESS TO A SERVER CONNECTED TO A PRIVATE COMPUTER NETWORK

[75] Inventor: Michael Eugene Cain, Arvada, Colo.

[73] Assignee: U S West, Inc., Englewood, Colo.

[21] Appl. No.: 762,761

[22] Filed: Dec. 10, 1996

[51] Int. Cl.⁶ .................................................. G06F 11/00
[52] U.S. Cl. ........................... 395/187.01; 395/188.01
[58] Field of Search ........................ 395/186, 187.01,
   395/188.01, 200.54, 200.55, 200.56, 200.68;
   707/7, 9, 10; 310/3, 4, 23, 25; 380/23,
   25

[56] References Cited

U.S. PATENT DOCUMENTS

| | | | |
|---|---|---|---|
| 5,455,953 | 10/1995 | Russell | 395/187.01 |
| 5,481,720 | 1/1996 | Loucks et al. | 395/187.01 |
| 5,550,984 | 8/1996 | Gelb | 395/187.01 |
| 5,560,008 | 9/1996 | Johnson et al. | 395/650 |
| 5,586,260 | 12/1996 | Hu | 395/187.01 |
| 5,623,600 | 4/1997 | Ji et al. | 395/187.01 |
| 5,623,601 | 4/1997 | Vu | 395/188.01 |

OTHER PUBLICATIONS

Kiuchi et al., "C-HTTP-The Development Of A Secure Closed HTTP Based Network On The Internet", IEEE, PRoceeding of SNDSS, pp. 64-75, Jun. 1996.

Nueman, "Proxy Based Authorization and Accounting For Distributed Systems", IEEE, pp. 283-291, 1993.

*Primary Examiner*—Joseph Palys
*Attorney, Agent, or Firm*—Brooks & Kushman PC

[57] ABSTRACT

A method and system for providing secured access to a server connected to a private computer network protected by a router acting as a firewall is provided. The method includes establishing a bypass communication route around the firewall router, exchanging information between a client and the server via the bypass communication route, and closing the bypass communication route. The system includes an external machine, an external communication channel, an internal machine, an internal communication channel, and a dedicated private communication channel. Each of these components in combination form a bypass communication route around the firewall router.

12 Claims, 2 Drawing Sheets

METHOD AND SYSTEM FOR PROVIDING SECURED ACCESS TO A SERVER CONNECTED TO A PRIVATE COMPUTER NETWORK

TECHNICAL FIELD

This invention relates to a method and system for providing secured access to a server connected to a private computer network and, more particularly, to a method and system for providing secured access to a server connected to a private computer network protected by a router acting as a firewall by a client on a public network outside the firewall.

BACKGROUND ART

Many routine business transactions require the exchange of information or data between two or more parties. There is a variety of media through which this information may be exchanged. Nevertheless, the recent connection of many private computer networks and many global public computer networks via the Internet has further promoted the use of electronic data exchange. Electronic data exchange via the Internet is inexpensive and quick. However, there are concerns associated with electronic data exchange.

A top concern with electronic data exchange is the security of information, specifically the security of information maintained on a private computer network when access from outside the network has been granted. A typical network is comprised of several computers, with each computer maintaining information which requires some level of security. It is common to maintain both high level security information and low level security information on the same network.

In a typical data exchange, a client outside the private network will require access to information maintained on a single computer within a network. Often, the client will request network access via Internet's World Wide Web client and server protocol. To protect information maintained on other computers within the network, any access to the network must be appropriately restricted. Private computer networks are commonly protected from external attack or unauthorized access via the Internet through the use of a router acting as a firewall.

A firewall router is essentially a packet filter, allowing communication between selected combinations of internal and external machines. Packets which do not satisfy filter conditions are discarded by the firewall router. However, a firewall router has several limitations. First, as the number of filter conditions are increased, the performance of the firewall router is diminished. Second, it is difficult to completely test the bounds of a filter condition and, as such, there exists the possibility a filter may be defined too broadly, allowing unintended communications to pass. Third, a firewall router typically permits only machines inside the firewall to initiate communication with a machine outside the firewall. Finally, a firewall router is unable to provide a client with sufficient diagnostic error information in the event that a target server is unavailable. For many types of data exchanges these limitations are undesirable.

In summary, there exists a need for a method and system for providing a secured access to a private computer network which is protected by a firewall router.

SUMMARY OF THE INVENTION

An object of the present invention is to provide a method and system for providing a client secured access from outside a firewall router to a selected server attached to a private computer network located inside the firewall router without compromising the security of other computers within the network.

Another object of the present invention is to provide a method and system for providing a client access from outside a firewall router to a selected server, which is transparent to both the client and the server.

In carrying out the above objects and other objects, features, and advantages of the present invention, a system for providing secured access to a server connected to a private computer network protected by a router acting as a firewall is provided. The system includes an external machine, an external communication channel, an internal machine, an internal communication channel, and a dedicated private communication channel. Each of these components in combination form a bypass communication route around the firewall router.

A method for providing secured access to a server connected to a private computer network protected by a router acting as a firewall is also provided. The method includes establishing a bypass communication route around the firewall router, exchanging information between a client and the server via the bypass communication route, and closing the bypass communication route.

The above objects and other objects, features, and advantages of the present invention will be readily apparent from the following detailed description of the best mode for carrying out the invention when taken in conjunction with the accompanying drawings.

BEST MODE FOR CARRYING OUT THE INVENTION

Figure 1:
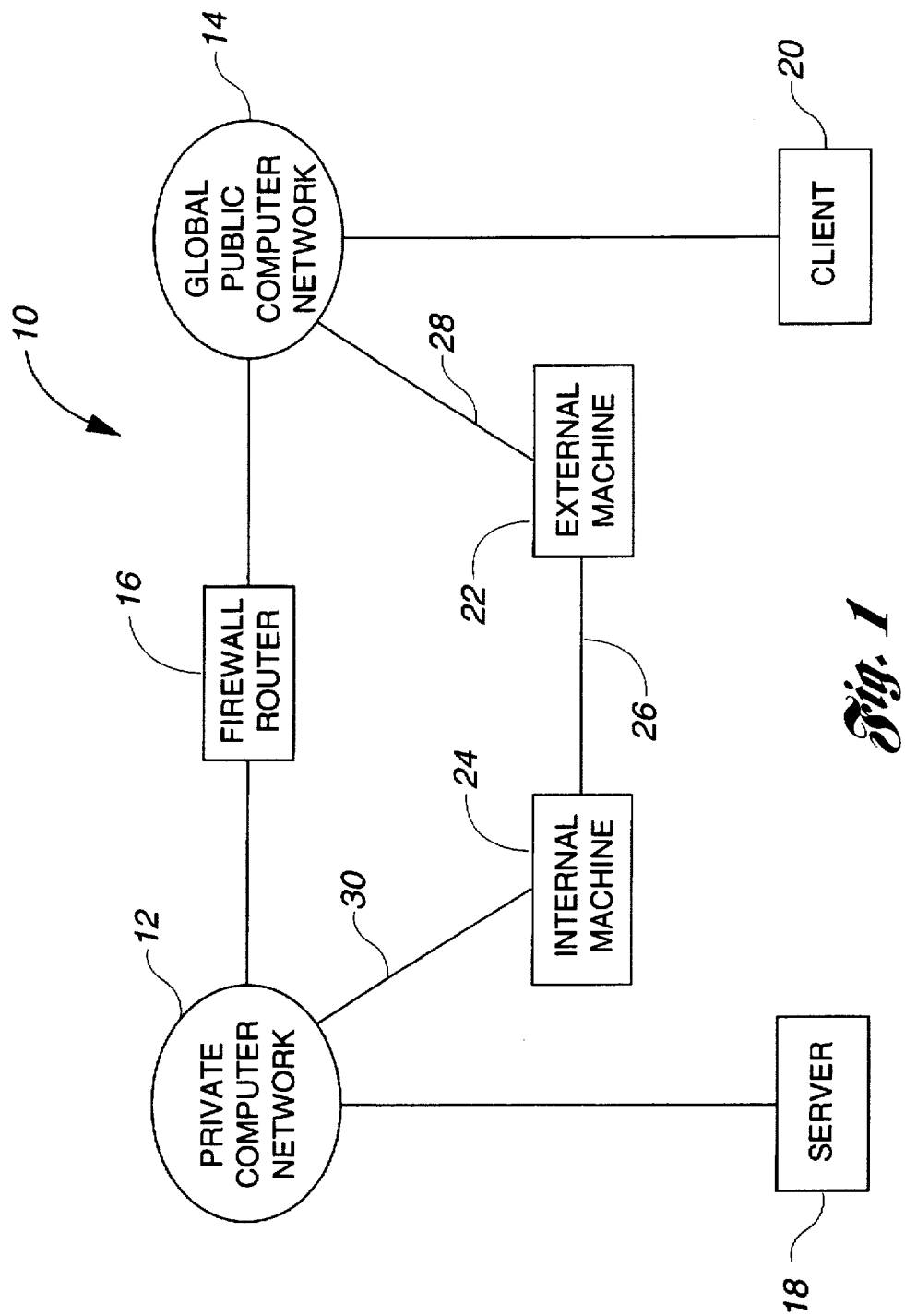
FIG. 1 is a block diagram of a system for providing secured access to a server connected to a private computer network.

Referring to FIG. 1, a block diagram illustrating a system 10 for providing a secured access to a server connected to a private computer network is shown. A private computer network 12 is in communication with a global public computer network 14. The global public computer network 14 may be a local-area network (LAN), wide-area network (WAN), the World Wide Web (WWW), or any other type of computer network.

Private computer network 12 is protected from external attack or unauthorized access via the global public computer network 14 by a firewall router 16. The firewall router 16 is essentially a packet filter, allowing communication between preselected combinations of machines located on opposite sides of the firewall. Packets which do not satisfy filter conditions are discarded by the firewall router 16.

Connected to the private computer network 12 is a server 18 to which a client 20 requires access. To gain access to the server 18, communications from the client 20 will need to pass through or bypass the firewall router 16. Allowing direct access through the firewall router 16 creates a variety of potential security problems described previously. To create a bypass of the firewall router 16, the system 10 includes an external or first machine 22 and an internal or second machine 24. External machine 22 is located outside the firewall router 16. Internal machine 24 is located inside the firewall router 16. External machine 22 and internal machine 24 are directly connected via a dedicated private communication link 26. External machine 22 is operated by a software program referred to as the outside program. Internal machine 24 is operated by a software program referred to as the inside program.

The bypass route is complete when an external or first communication channel 28 and an internal or second communication channel 30 are established. External communication channel 28 is established between the global public computer network 14 and the external machine 22. Internal communication channel 30 is established between the internal machine 24 and the private computer network 12.

Figure 2:
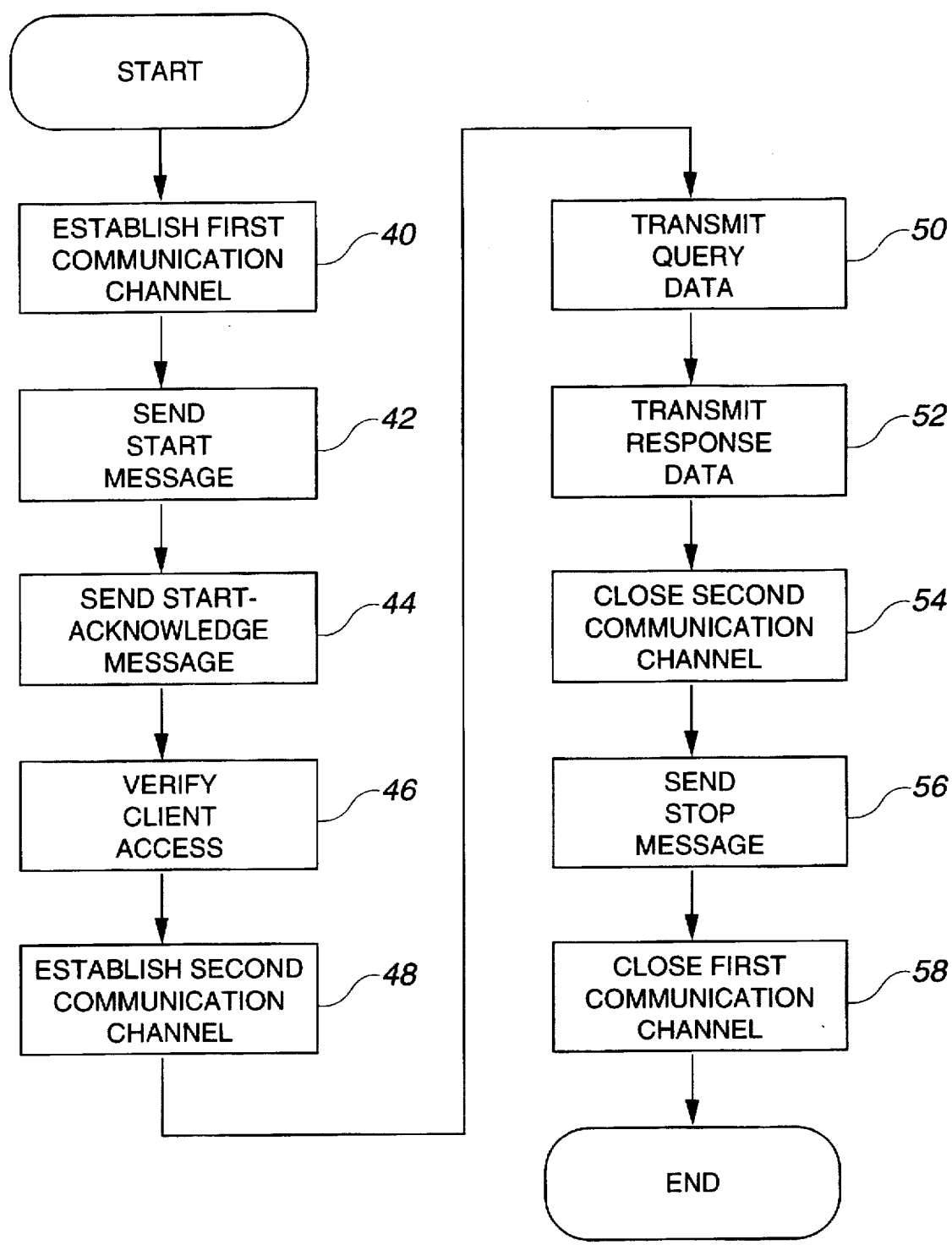
FIG. 2 is a flow chart illustrating a method for providing secured access to a server connected to a private computer network.

Referring now to FIG. 2, a flow chart illustrating a method for providing secured access to a server connected to a private computer network is shown. Although this method is not limited to use with system 10 of FIG. 1, specific disclosure to adapt this method to system 10 is included. As will be appreciated by one of ordinary skill in the art, although the flow chart illustrates sequential steps, the particular order of processing is not important to achieving the objects of the present invention. As will be recognized, the method illustrated may be performed in software, hardware, or a combination of both as in a preferred embodiment of the present invention.

As represented by block 40 of FIG. 2, a first communication channel between a client and an external machine is established. Ordinarily, the client will request this connection via a global public computer network. In system 10 of FIG. 1, the external machine 22 is located outside the firewall router 16. Completion of this step establishes the external communication channel 28 of system 10.

A START message is sent from the external machine to an internal machine as illustrated by block 42 of FIG. 2. The START message initiates communication between the external machine and the internal machine. The START message also supplies information about the client requesting the connection to the internal machine. This client information includes the internet protocol (IP) address of the client. In system 10 of FIG. 1, this START message is transmitted via a dedicated private communication link 26 and the internal machine 24 is located inside the firewall router 16.

A START-ACKNOWLEDGED message is sent from the internal machine to the external machine as represent by block 44 of FIG. 2. This message notifies the external machine that the internal machine has received the START message.

The internal machine verifies that the client has permission to access the target server as illustrated by block 46 of FIG. 2. As will be appreciated by one of ordinary skill in the art, this client verification process may be performed in one of several conventional ways including the use of password identification or client IP address recognition.

A second communication channel between the internal machine and the server is established as represented by block 48 of FIG. 2. Completion of this step establishes the internal communication channel 30 of system 10 in FIG. 1.

Query data is transmitted from the client to the server as illustrated by block 50 of FIG. 2. In system 10 of FIG. 1, the data is transmitted via a communication path consisting of the external machine 22, the dedicated private communication link 26, and the internal machine 24. This communication path bypasses the firewall router 16.

Response data is transmitted from the server to the client as represented by block 52 of FIG. 2. In system 10 of FIG. 1, the data is transmitted via a communication path consisting of the internal machine 24, the dedicated private communication link 26, and the external machine 22.

Closing the second communication channel as illustrated by block 54 of FIG. 2. Closing of the second communication channel can be initiated by the server upon completion of data transmission or by the client at any time.

Sending a STOP message from the internal machine to the external machine as represented by block 56 of FIG. 2. This message notifies the external machine that the second communication has been closed.

Closing the first communication channel as illustrated by block 58 of FIG. 2. The closing of the first communication channel occurs in response to receipt by the external machine of the STOP message.

A key feature to both the system and the method disclosed above is the security of information. In system 10 of FIG. 1 and the method illustrated in FIG. 2, it is the external machine 22 which is subject to attack by parties outside the private computer network 12. For security purposes, the external machine 22 is barricaded and IP forwarding is disabled.

A daemon is a program not explicitly used but which lies dormant waiting for the occurrence of some condition(s). Machines configured to run only selected daemons are said to be barricaded. Accordingly, in the system and method disclosed above, the outside program is the only network-aware application or daemon running on the external machine 22. The external machine 22 is, therefore, barricaded.

IP forwarding, also known as IP-in-IP, is a process to route packets through a network. An IP-in-IP packet is comprised of an internal packet and an external wrapper. Both the internal packet and the external wrapper contain information including an address to which each component is to be sent. During the IP forwarding process, it is possible that a first machine, identified by the wrapper address, will receive the entire IP packet, remove the wrapper, and pass along the internal packet to a second machine, identified by the internal packet address. To prevent this possible breach in security, external machine 22 is unable to perform IP forwarding. If external machine 22 were capable of forwarding IP packets, it could function as a router and permit the internal machine 24 to be accessed by an external attacker. The combination of barricading and disabling IP forwarding prevents unintended packets from reaching machines on the private computer network 12.

Another key feature to the system and method disclosed above is transparency. Specifically, the combination of external machine 22, dedicated private communication link 26, and internal machine 24 to provide a bypass of the firewall router 16 is transparent to both the client 20 and the server 18. Transparency is a unique feature to proxy systems, which are typically specific to one application-level protocol.

Both the outside program and the inside program operate at the transmission control protocol (TCP) byte stream level. Unlike other proxy systems, any application-level protocol built on top of a single TCP byte stream should operate properly within the system 10. Additionally, the system 10 also supports applications that use encrypted byte streams. Once a connection between client 20 and server 18 is established, neither the external machine 22 nor the internal machine 24 monitors or alters transmitted TCP reliable byte stream data. For example, if an encrypted byte stream is sent by the client 20 then that same encrypted byte stream is received by the server 18.

An application-specific protocol is used for communications between the external machine 22 and the internal machine 24. In a preferred embodiment of the invention, a single TCP connection is used to pass messages between the inside program and the outside program. Since TCP provides a reliable byte stream without any additional structure, both the inside program and the outside program employ a length/content method of marking messages within the byte stream. When a message is sent, the message length is written as a two-byte value, with the most significant byte first. The two-byte value is then followed by that number of bytes of message content.

The first byte of each message identifies the message type. The following types of messages are available: a START message, a STOP message, a DATA message, a LOG message, a START-ACKNOWLEDGED message, and a STOP-ACKNOWLEDGED message. In a preferred embodiment of the invention, each type of message is identified by the corresponding numeric value: START—1, STOP—2, DATA—3, LOG—4, START-ACKNOWLEDGED—5, and STOP-ACKNOWLEDGED—6.

With the exception of LOG messages, the second byte of the message is a transaction identifier. Transaction identifiers are assigned by the outside program when a TCP connection request from a client is accepted. Transaction identifiers are necessary because the inside program and the outside program multiplex several byte streams onto the single TCP connection.

In START messages, the transaction identifier is followed by a four-byte representation of the IP address of the client requesting connection to the internal machine 24. As discussed below, the IP address of the client is recorded by the inside program in a log file. In DATA messages, the transaction identifier is followed by a portion of the contents of the byte stream associated with the transaction. A maximum of 512 data bytes are allowed in a message. In LOG messages, the message type is followed by a character string which is to be recorded in a log file. A maximum of 512 data bytes are allowed in a string.

In addition to being used to exchange data between the client 20 and the server 18, the application-specific protocol passes a variety of information between the outside program and the inside program for logging. In a preferred embodiment of the invention, both the inside program and the outside program write various timestamped messages to log files.

The inside program records both usage information and operational state information. Usage information logged by the inside program includes the IP address of any client requesting access to the inside machine 24. Such logs are necessary to collect data concerning attempts to attack the server 18 through the normal access method.

Similar to the inside program, the outside program records operational state information. Operational state information logged by the outside program includes messages such as: connection to the inside program established, connection the inside program lost, etc. However, the log files of the outside program stored in the barricaded external machine 22 are accessible only from the console of the external machine 22. Due to this inconvenience, detailed usage messages are not written by the outside program. When the outside program needs to record usage information, a LOG message containing the usage information is sent from the outside program to the inside program. Thereafter, the inside program writes the content of the message into an inside log file. In addition to convenience of access for administration, recording usage information on the inside machine provides additional security. If the information were recorded on the outside machine, and if the outside machine were successfully attacked and access gained by an outside user, the outside user might be able to conceal their identity or some aspects of their attack by modifying the log files. Logging information on the inside machine makes such modifications by an attacker more difficult.

Both the inside program and the outside program are to be started as part of the local boot process. Each program accepts a single optional command-line argument which specifies the name of the configuration file the program should read upon boot-up.

A configuration file consists of several lines of text, each containing a keyword. In most cases, each keyword is assigned a value. The configuration file keywords for the outside program and inside program must appear exactly as shown in the following examples. The keyword and value must be separated by blanks and/or tabs. Blank lines are skipped. There is no provision for comments. Keywords can appear in any order. Keywords can appear more than once, and the value associated with the last appearance will be used.

The configuration file for the outside program includes the following keywords: "host-ip", "host-port", "client-port", "log-file", and "send-html". The keyword "host-ip" specifies the IP address of the internal machine 24 from which this copy of the outside program will accept a connection. Copies of the inside program running on other machines will be denied. This address must appear in standard dotted-decimal format. The default value for "host-ip" is 127.0.0.1.

The keyword "host-port" specifies the TCP port on which this copy of the outside program will listen for connections from the corresponding copy of the inside program. The default value for "host-port" is 19274.

The keyword "client-port" specifies the TCP port on which this copy of the outside program will listen for connections from client applications. The default value for "client-port" is 80.

The keyword "log-file" specifies the name of the log file to which this copy of the outside program should write LOG messages. The log file will be created if it does not already exist. If the log file already exists, messages will be appended to the end of the file rather than overwriting the existing content.

The keyword "send-html" specifies that this copy of the outside program should send HTML content to a connected client 20 if a communication error occurs farther along the communication path towards the server 18. Such errors include not being connected to a copy of the inside program or being denied service. This keyword does not take a value. Note that when the send-HTML option is used, the use of the present invention is confined to clients which are expecting an HTTP (Hyper-Text Transfer Protocol) complaint response from the server.

The configuration file for the inside program includes the following keywords: "server-ip", "server-port", "slave-ip", "slave-port", "log-file", "mail-string", and "send-html". The keyword "server-ip" specifies the IP address of the server 18 that is the actual target of client 20. The address may appear in either dotted-decimal or DNS formats. The target server IP address must be provided in the configuration file.

The keyword "server-port" specifies the TCP port on which the target server 18 listens for connections. The default value for "server-port" is 80.

The keyword "slave-ip" specifies the IP address of the external machine 22 running the copy of the outside program to which this copy of the inside program should connect. This address must be given in standard dotted-decimal format. The default value for standard dotted-decimal format. The default value for "slave-ip" is 127.0.0.1.

The keyword "slave-port" specifies the TCP port to which the corresponding copy of the outside program is listening for connections from this copy of the inside program. Note that corresponding copies of the inside program and the outside program which are intended to communicate must read configuration files that allow them to do so. The default value for "slave-port" is 19274.

The keyword "log-file" specifies the name of the log file to which this copy of the inside program should write LOG messages. The log file will be created if it does not already exist. If the file already exists, messages will be appended to the end of the file rather than overwriting the existing content.

The keyword "mail-string" specifies a command used to notify a higher authority when the corresponding copy of the outside program cannot be contacted for more than one hour. The default value for "mail-string" is "mail mcain". Note that this value is highly specific to the operating system on which this software is currently implemented (UNIX) and the way the e-mail system is administered on that particular machine. Other installations might use a different command that takes very different arguments.

The keyword "send-html" specifies that this copy of the inside program should send HTML pages indicating communications errors back towards the client 20. Note that when the send-HTML option is used, the use of the present invention is confined to clients which are expecting an HTTP complaint response from the server.

In order to operate successfully, the external machine 22 and the internal machine 24 must be able to successfully route IP packets between each other. If configured in a typical manner for a host with only one network interface, the external machine 22 and the internal machine 24 would attempt to route packets through the firewall router 16. These packets would be blocked and communication would not be possible. Both the external machine 22 and the internal machine 24 must be configured to route packets intended for each other over the dedicated private communication link 26. The means for setting such IP routing information vary from one operating system to another, therefore, the following setting means should be considered an example only.

Assume that the internal machine 22 has an IP address 192.168.1.1 and the external machine 24 has an IP address 192.168.2.2. Assume further that the dedicated private communication link 26 is referred to as "eth1" on the external machine 22 and the internal machine 24. For proper IP routing, the external machine 22 would require an additional entry of "/sbin/route add -host 192.168.1.1 eth1" and the internal machine 24 would require an additional entry of "/sbin/route add -host 192.168.2.2 eth1".

The combination of IP routing information and configuration files causes administration errors to fail in ways that are easily and quickly detected. Unless all values match one another, the desired communication does not occur. Since all addresses are complete host addresses only the desired communication channel is opened. This same degree of security is maintained even if the dedicated private communication link 26 is expanded into a small private network because allowed communication is still only between pairs of machines, not all machines on the private computer network 12.

It is to be understood that while the present invention as implemented uses TCP/IP protocols/address/etc., one skilled in the art would recognize that the invention could be applied to other kinds of networks that use routers, such as Microsoft IPX networks.

It is to be understood, of course, that while the forms of the invention described above constitute the best mode contemplated of practicing the present invention, the preceding description is not intended to illustrate all possible forms thereof. It is also to be understood that the words used are words of description, rather than of limitation, and that various changes may be made without departing from the spirit and scope of the present invention, which should be construed according to the following claims.

What is claimed is:

1. A system for providing secured access to a server connected to a private computer network protected by a router acting as a firewall, the system comprising:

an external machine located outside the firewall router, the external machine operated by an outside software program and barricaded such that only one network-aware application is run on the external machine;

an external communication channel established between the external machine and a client via a global public computer network;

an internal machine located inside the firewall router, the internal machine operated by an inside software program;

an internal communication channel established between the internal machine and a server via the private computer network; and a dedicated private communication channel connected between the external machine and the internal machine.

2. The system of claim 1 wherein the global public computer network is a local-area network (LAN).

3. The system of claim 1 wherein the global public computer network is a wide-area network (WAN).

4. The system of claim 1 wherein the global public computer network is the Internet.

5. The system of claim 1 wherein the external machine does not perform IP forwarding.

6. The system of claim 1 wherein the dedicated private communication channel is controlled by an application-specific protocol.

7. A method for providing secured access from a client connected to a public computer network to a server connected to a private computer network protected by a router acting as a firewall coupled between the public computer network and the private computer network, the method comprising:

providing an external machine located outside the firewall router and connected to the public computer network, the external machine operated by an outside software program and barricaded such that only one network-aware application is run on the external machine;

providing an internal machine located inside the firewall router and operated by an inside software program;

connecting the external machine to the internal machine via a dedicated private communication channel;

establishing an external communication channel between the external machine and the client via the public computer network;

establishing a second communication channel between the external machine and the internal machine via the dedicated private communication channel in response to the external communication channel;

establishing an internal communication channel between the internal machine and the server via the private computer network in response to the second communication channel so as to provide secured access to the server.

8. The method as recited in claim 7 wherein establishing the external communication channel includes transmitting information concerning the client.

9. The method as recited in claim 8 wherein transmitting the information includes transmitting an IP address of the client.

10. The method as recited in claim 7 wherein establishing the internal communication channel includes verifying the client has permission to access the server.

11. The method as recited in claim 10 wherein verifying the client has permission includes requiring entry of a valid password identification.

12. The method as recited in claim 10 wherein verifying the client has permission includes comparing a computer IP address of the client to a predetermined list of pre-approved IP addresses.

* * * * *